(12) United States Patent
Aoki et al.

(10) Patent No.: US 9,014,643 B2
(45) Date of Patent: Apr. 21, 2015

(54) DEVICE TO TEST MOBILE TERMINAL AND TESTING METHOD THEREOF

(71) Applicants: Kazunori Aoki, Atsugi (JP); Naofumi Naruse, Atsugi (JP); Toyohiro Kayanuma, Atsugi (JP); Ikuya Otani, Atsugi (JP)

(72) Inventors: Kazunori Aoki, Atsugi (JP); Naofumi Naruse, Atsugi (JP); Toyohiro Kayanuma, Atsugi (JP); Ikuya Otani, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 101 days.

(21) Appl. No.: 14/024,226

(22) Filed: Sep. 11, 2013

(65) Prior Publication Data

US 2014/0080424 A1    Mar. 20, 2014

(30) Foreign Application Priority Data

Sep. 18, 2012  (JP) .................. 2012-204476

(51) Int. Cl.
| | | |
|---|---|---|
| H04B 17/00 | (2006.01) | |
| H04B 3/46 | (2006.01) | |
| H04Q 1/20 | (2006.01) | |
| H04W 24/06 | (2009.01) | |

(52) U.S. Cl.
CPC .......... *H04W 24/06* (2013.01); *H04B 17/0085* (2013.01); *H04B 17/23* (2015.01); *H04B 17/29* (2015.01)

(58) Field of Classification Search
CPC ........ H04W 24/02; H04W 24/06; H04B 3/46; H04B 17/0085; H04B 17/0087; H04B 17/15; H04B 17/19; H04B 17/29
See application file for complete search history.

(56) References Cited

U.S. PATENT DOCUMENTS

| | | | | |
|---|---|---|---|---|
| 6,259,314 | B1 * | 7/2001 | Liu et al. ................. | 329/304 |
| 6,438,173 | B1 * | 8/2002 | Stantchev ................ | 375/260 |
| 6,809,669 | B1 * | 10/2004 | Robinson ................ | 341/131 |
| 2005/0207335 | A1 * | 9/2005 | Schmidl et al. .......... | 370/206 |
| 2005/0265499 | A1 * | 12/2005 | Zhang ..................... | 375/354 |
| 2008/0291987 | A1 * | 11/2008 | Kumaki et al. .......... | 375/224 |
| 2010/0093283 | A1 | 4/2010 | Negami et al. | |
| 2010/0321127 | A1 * | 12/2010 | Watanabe et al. ....... | 332/149 |
| 2011/0053516 | A1 | 3/2011 | Harteneck | |
| 2012/0230372 | A1 * | 9/2012 | Park et al. ............... | 375/148 |
| 2012/0300825 | A1 * | 11/2012 | Ito et al. ................. | 375/226 |
| 2013/0064117 | A1 * | 3/2013 | Hashimoto et al. ...... | 370/252 |

FOREIGN PATENT DOCUMENTS

| | | |
|---|---|---|
| JP | 11-313042 | 11/1999 |
| JP | 2006-029862 | 2/2006 |
| JP | 2011-519514 | 7/2011 |
| JP | 2012-503347 | 2/2012 |
| WO | WO 2008/096551 A1 | 8/2008 |
| WO | WO 2010/010516 A2 | 1/2010 |

OTHER PUBLICATIONS

Japanese Office Action issued in Japanese Patent App. No. 2012-204476, mailed Aug. 19, 2014.

* cited by examiner

*Primary Examiner* — Andrew Wendell
(74) *Attorney, Agent, or Firm* — Greer, Burns & Crain, Ltd.

(57) ABSTRACT

A mobile terminal testing device includes a reproduction unit that reproduces a BB signal to output at least one reproduced BB signal, an adder that adds a BB signal that are frequency-shifted and a reproduced BB signal to output an added BB signal, an up-converter that generates a multicarrier test signal by making a frequency conversion of the added BB signal of an I phase and Q phase and outputs the multicarrier test signal to UE, and an analyzer that analyzes a response signal output by the UE in response to the multicarrier test signal and the analyzer includes a throughput calculation unit that calculates throughput for the multicarrier test signal and an RSRP acquisition unit that acquires RSRP.

16 Claims, 7 Drawing Sheets

F I G. 1 A 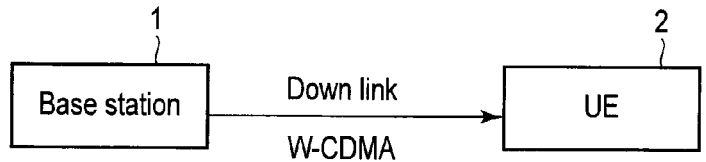
F I G. 1 B  DC-HSDPA 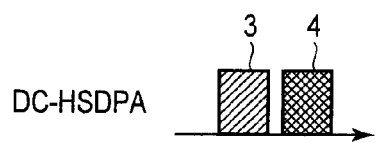
F I G. 1 C  4C-HSDPA 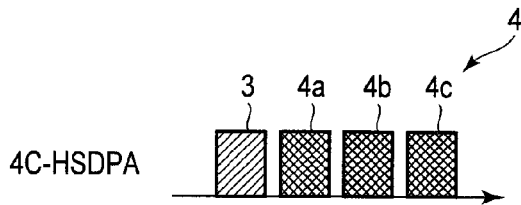
F I G. 1 D  8C-HSDPA 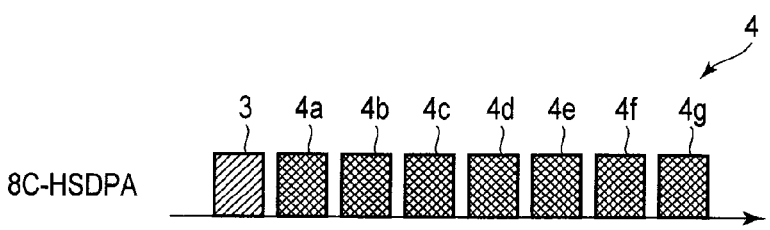

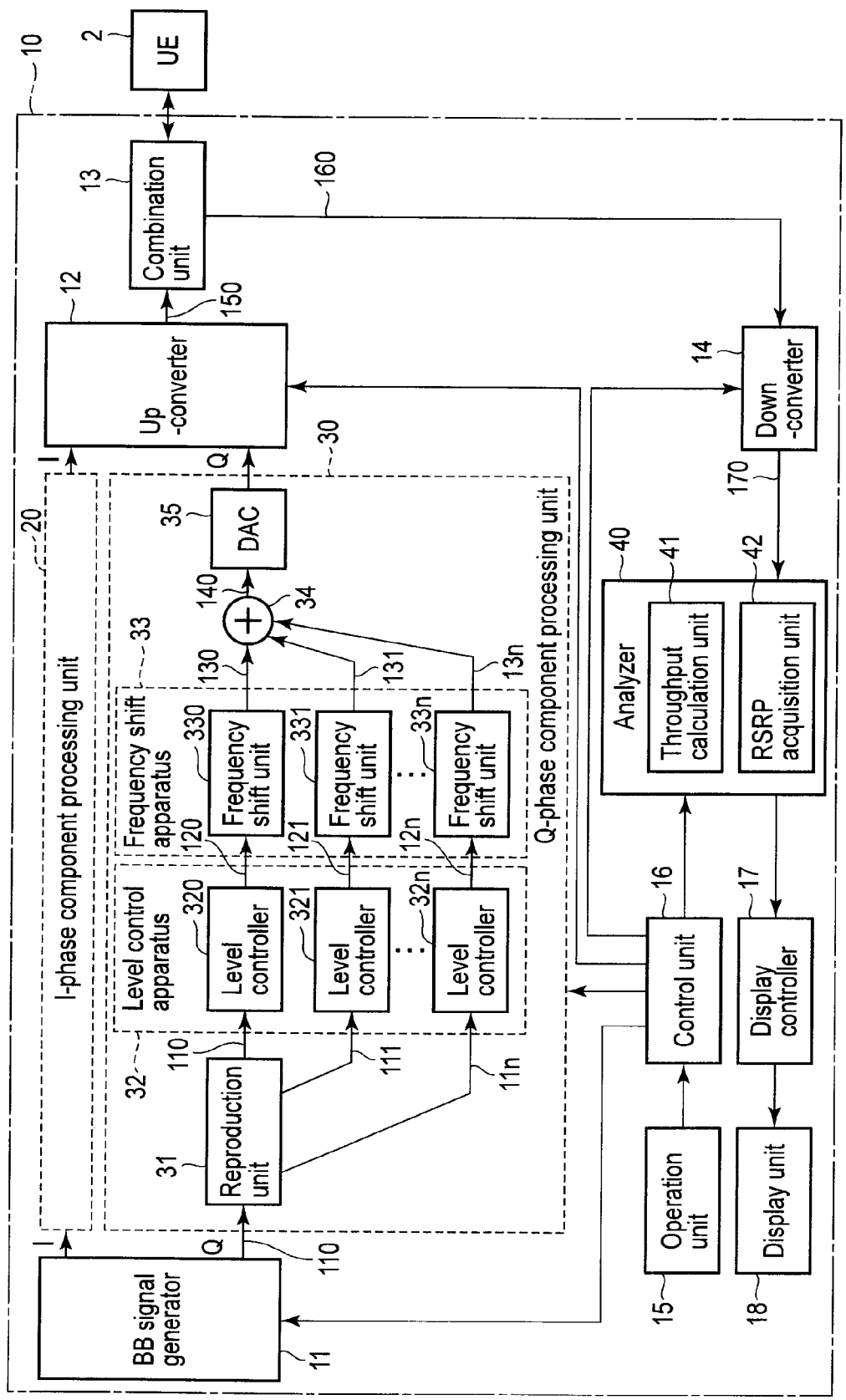
F I G. 3

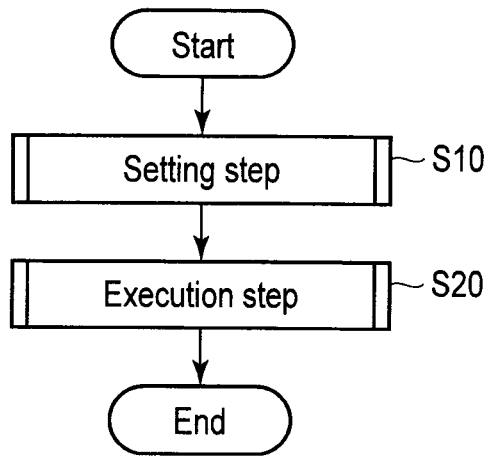
F I G. 4
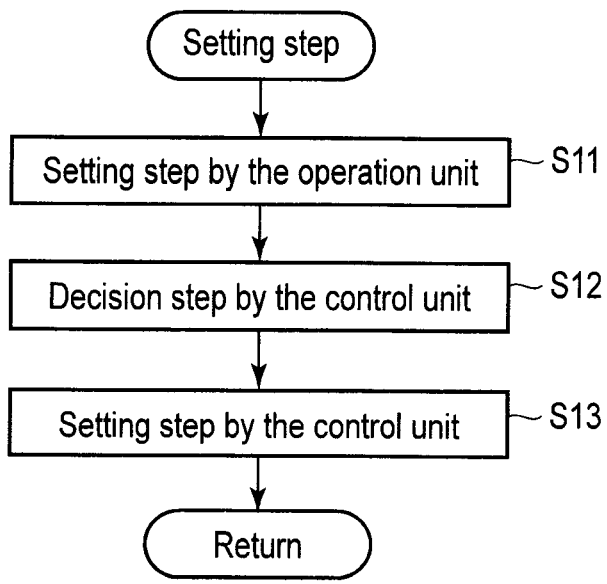
F I G. 5

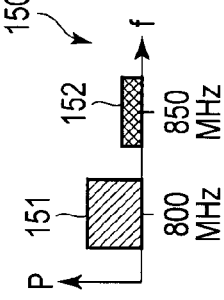
F I G. 6 A
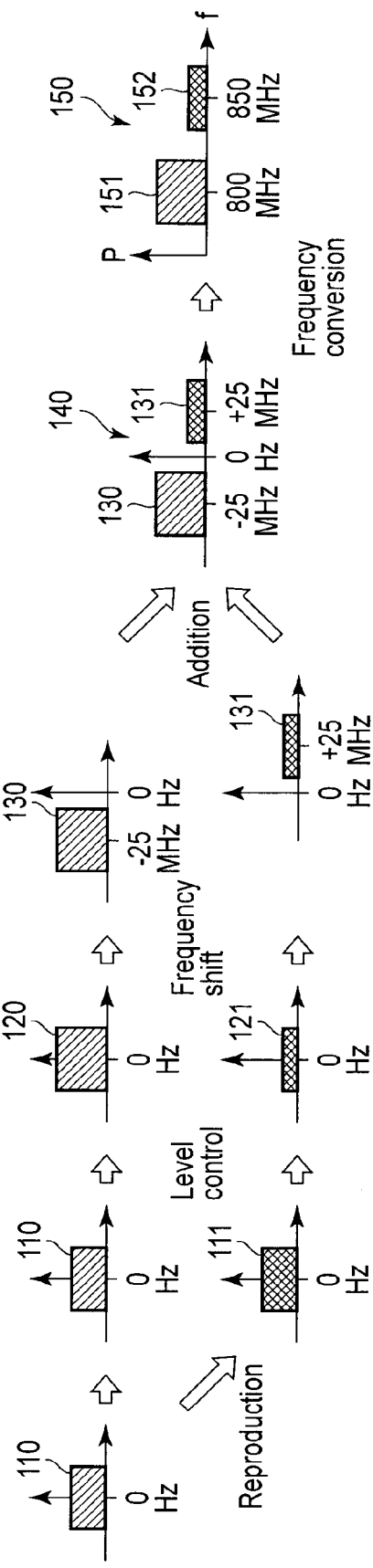
F I G. 6 B

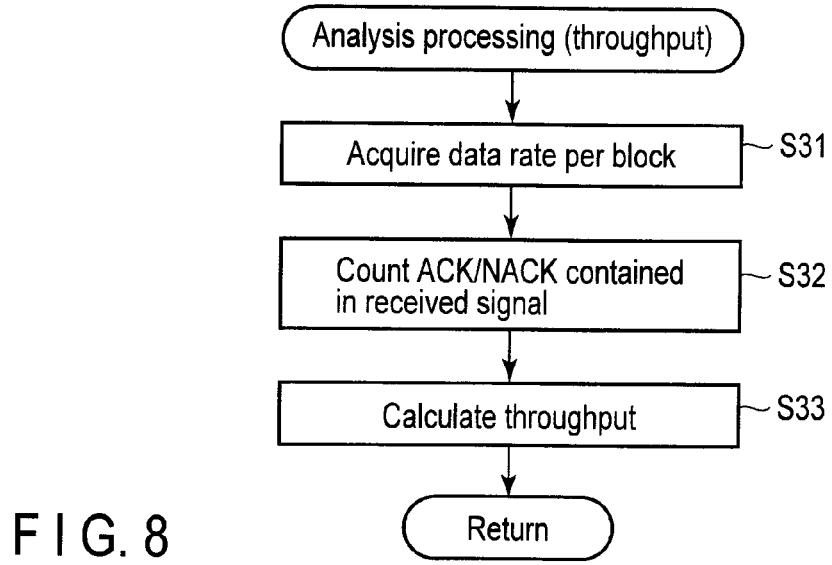
F I G. 8
F I G. 9
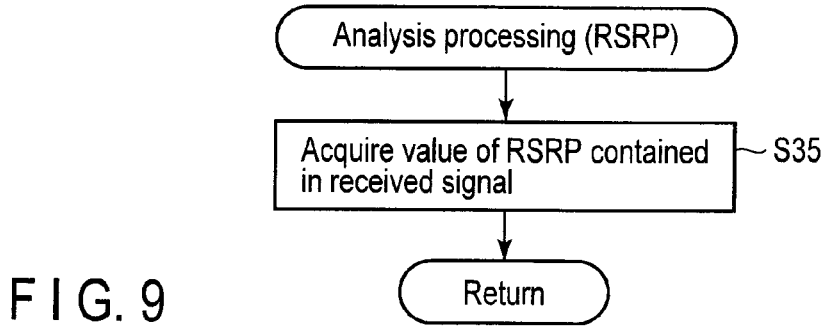
F I G. 10

DEVICE TO TEST MOBILE TERMINAL AND TESTING METHOD THEREOF

CROSS-REFERENCE TO RELATED APPLICATIONS

This application is based upon and claims the benefit of priority from prior Japanese Patent Application No. 2012-204476, filed Sep. 18, 2012, the entire contents of which is incorporated herein by reference.

BACKGROUND OF THE INVENTION

1. Field of the Invention

The present invention relates to a device to test a mobile terminal and a testing method thereof.

2. Description of the Related Art

In recent years, a technique called a multicarrier mode in which a plurality of carriers is bundled is actively introduced to improve the communication speed of a mobile communication system. Examples of the multicarrier mode include MC (Multi Carrier)-HSDPA (High-Speed Downlink Packet Access) as a high-speed version of W-CDMA (Wideband-Code Division Multiple Access), MC-EVDO (EV-DO Rev.B) as a high-speed version of EVDO (Evolution Data Only), and CA (Carrier Aggregation) as a high-speed technology of LTE-A (Long Term Evolution-Advanced).

A waveform generating device described in Jpn. Pat. Appln. KOKAI Publication No. 2006-29862 has been known as a device to test a mobile terminal adopting the multicarrier mode.

The device described in Jpn. Pat. Appln. KOKAI Publication No. 2006-29862 includes a plurality of waveform information storage units that stores waveform information, a plurality of waveform operation units that operates waveform information from each waveform information storage unit and outputs an operation result at a desired level, and a combination operation unit that combines each piece of waveform information from each waveform operation unit and is configured to be able to output a multicarrier waveform.

However, it is necessary for the device described in Jpn. Pat. Appln. KOKAI Publication No. 2006-29862 to provide as many waveform information storage units as the number of carriers to output a multicarrier waveform and, as a result, the structure of the device becomes more complicated with an increasing number of carriers, causing a problem of a substantial increase in manufacturing costs.

BRIEF SUMMARY OF THE INVENTION

An object of the present invention is to provide a mobile terminal testing device and a mobile terminal testing method capable of testing a mobile terminal supporting the multicarrier mode with a structure simpler than before.

According to claim 1 of the present invention, there is provided a mobile terminal testing device (10) comprising:

a baseband signal output means (11) for outputting a baseband signal (110) having a predetermined bandwidth and signal level;

a radio frequency test signal output means (12) for converting a frequency of the baseband signal based on a predetermined oscillation frequency to generate a test signal and outputting the test signal, wherein a multicarrier test signal (150) is generated as the test signal, the multicarrier test signal (150) including a first radio frequency signal (151) having a first center frequency and a second radio frequency signal (152) having a second center frequency that is different from the first center frequency, and the multicarrier test signal is output to a mobile terminal (2) to be tested;

a reproduced baseband signal output means (31) for reproducing the baseband signal to output a reproduced baseband signal (111);

a frequency shift means (33) for shifting a frequency of the reproduced baseband signal by a desired frequency shift value; and a baseband signal addition means (34) for adding the baseband signal and the frequency-shifted reproduced baseband signal (131) to output an added baseband signal (140), wherein the added baseband signal is so frequency-converted as to generate the multicarrier test signal in the radio frequency test signal output means.

With the above configuration, in a mobile terminal testing device according to claim 1 of the present invention, the reproduced baseband signal output means (31) reproduces a baseband signal to output at least one reproduced baseband signal, the baseband signal addition means (34) adds the baseband signal and the reproduced baseband signal, at least one of which is frequency-shifted, to output an added baseband signal, and the radio frequency test signal output means (12) converts the added baseband signal into a multicarrier test signal in a radio frequency region to be able to output the multicarrier test signal to the mobile terminal (UE).

That is, a mobile terminal testing device according to claim 1 of the present invention needs only to include one baseband signal output means that generates a baseband signal in a test of a mobile terminal regardless of the number of carriers contained in a multicarrier test signal.

Therefore, a mobile terminal testing device according to claim 1 of the present invention can test a mobile terminal supporting a multicarrier mode with a structure simpler than before.

According to claim 2 of the present invention, the mobile terminal testing device according to claim 1 further comprises a response signal analysis means (40) for receiving a response signal (160) to the multicarrier test signal from the mobile terminal and to analyze the received response signal, wherein the response signal analysis means includes a throughput calculation means (41) that calculates throughput of the mobile terminal regarding the multicarrier test signal.

With the above configuration, a mobile terminal testing device according to claim 2 of the present invention needs only to include one baseband signal output means that generates a baseband signal to calculate throughput for a multicarrier test signal regardless of the number of carriers contained in the multicarrier test signal and therefore, a mobile terminal supporting the multicarrier mode can be tested with a structure simpler than before.

According to claim 3 of the present invention, the mobile terminal testing device according to claim 2 further comprises a display means (18) for displaying the calculated throughput for each carrier contained in the multicarrier test signal.

With the above configuration, a mobile terminal testing device according to claim 3 of the present invention includes the display means that displays throughput for each carrier and therefore, a more detailed analysis result can be presented to a tester.

According to claim 4 of the present invention, the mobile terminal testing device according to claim 1, further comprising: a response signal analysis means (40) for receiving a response signal (160) to the multicarrier test signal from the mobile terminal and analyzing the received response signal, wherein the response signal analysis means includes a reference signal received power acquisition unit (42) that acquires reference signal received power indicating received power in the mobile terminal of reference signal components contained in the multicarrier test signal.

With the above configuration, a mobile terminal testing device according to claim 4 of the present invention needs only to include one baseband signal output means that generates a baseband signal to acquire reference signal received power regardless of the number of carriers contained in a multicarrier test signal and therefore, a mobile terminal supporting the multicarrier mode can be tested with a structure simpler than before.

According to claim 5 of the present invention, the mobile terminal testing device according to claim 4, further comprising: a display means (18) for displaying the acquired reference signal received power for each carrier contained in the multicarrier test signal.

With the above configuration, a mobile terminal testing device according to claim 5 of the present invention includes the display means that displays reference signal received power for each carrier and therefore, a more detailed analysis result can be presented to a tester.

According to claim 6 of the present invention, the mobile terminal testing device according to claim 1, further comprising: a frequency shift value calculation means (16) for calculating the frequency shift value, wherein
the frequency shift value calculation means calculates the oscillation frequency from a maximum center frequency and a minimum center frequency of each center frequency of the first radio frequency signal and the second radio frequency signal and calculates each frequency shift value of the baseband signal and the reproduced baseband signal based on the calculated oscillation frequency.

With the above configuration, a mobile terminal testing device according to claim 6 of the present invention includes the frequency shift value calculation means and therefore, each frequency shift value of the baseband signal and reproduced baseband signal can be calculated.

According to claim 7 of the present invention, the mobile terminal testing device according to claim 1, further comprising: a signal level adjustment means (32) for adjusting each signal level of the baseband signal and the reproduced baseband signal, wherein
the baseband signal addition means adds the baseband signal (120) and the reproduced baseband signal (121) whose signal level is adjusted.

With the above configuration, a mobile terminal testing device according to claim 7 includes the signal level adjustment means and therefore, each signal level of the baseband signal and reproduced baseband signal can be adjusted to a desired value.

According to claim 8 of the present invention, the mobile terminal testing device according to claim 1, wherein the multicarrier test signal has (N+1) radio frequency signals having mutually different center frequencies,
the reproduced baseband signal output means outputs the N reproduced baseband signals,
the frequency shift means frequency-shifts the baseband signal and the N reproduced baseband signals by mutually different frequency shift values, and
the baseband signal addition means adds all of the baseband signal and the N reproduced baseband signals that are frequency-shifted.

With the above configuration, in a mobile terminal testing device according to claim 8, the N reproduced baseband signals are prepared from one baseband signal and frequency-shifted by mutually different frequency shift values before being input into the baseband signal addition means. Then, these signals are all added and output as an added baseband signal by the baseband signal addition means.

That is, a mobile terminal testing device according to claim 8 of the present invention needs only to include one baseband signal output means that generates a baseband signal in a test of a mobile terminal regardless of the number of carriers (N+1) contained in a multicarrier test signal.

According to claim 9 of the present invention, there is provided a mobile terminal testing method comprising:
outputting a baseband signal (110) having a predetermined bandwidth and signal level (S21);
converting a frequency of the baseband signal based on a predetermined oscillation frequency to generate a test signal and outputting the test signal, wherein a multicarrier test signal (150) is generated as the test signal, the multicarrier test signal (150) including a first radio frequency signal (151) having a first center frequency and a second radio frequency signal (152) having a second center frequency that is different from the first center frequency, and the multicarrier test signal is output to a mobile terminal (2) to be tested;
reproducing the baseband signal to output a reproduced baseband signal (111) (S22);
shifting a frequency of the reproduced baseband signal by a desired frequency shift value (S24); and
adding the baseband signal and the frequency-shifted reproduced baseband signal (131) to output an added baseband signal (140) (S25), wherein the added baseband signal is so frequency-converted as to generate the multicarrier test signal in the radio frequency test signal output step.

With the above configuration, according to a mobile terminal testing method according to claim 9 of the present invention, at least one reproduced baseband signal is output by a baseband signal being reproduced in the reproduced baseband signal output step, an added baseband signal by the baseband signal and the reproduced baseband signal, at least one of which is frequency-shifted, being added in the baseband signal addition step, and the added baseband signal is converted into a multicarrier test signal, which can be output to a mobile terminal in the radio frequency test signal output step.

That is, a mobile terminal testing method according to claim 9 of the present invention needs only to include one baseband signal output step that generates a baseband signal in a test of a mobile terminal regardless of the number of carriers contained in a multicarrier test signal.

Therefore, a mobile terminal testing method according to claim 9 of the present invention
can test a mobile terminal supporting a multicarrier mode with a structure simpler than before.

According to claim 10 of the present invention, there is provided the mobile terminal testing method according to claim 9, further comprising: receiving a response signal (160) to the multicarrier test signal from the mobile terminal and analyzing the received response signal (S30), wherein
the analyzing the received response signal (S30) includes calculating throughput of the mobile terminal regarding the multicarrier test signal (S33).

With the above configuration, a mobile terminal testing method according to claim 10 of the present invention needs only to include one baseband signal output step that generates a baseband signal to calculate throughput for a multicarrier test signal regardless of the number of carriers contained in the multicarrier test signal and therefore, a mobile terminal supporting the multicarrier mode can be tested with a structure simpler than before.

According to claim 11 of the present invention, there is provided the mobile terminal testing method according to claim 10, further comprising: displaying the calculated throughput for each carrier contained in the multicarrier test signal (S28).

With the above configuration, a mobile terminal testing method according to claim 11 of the present invention includes the display step that displays throughput for each carrier and therefore, a more detailed analysis result can be presented to a tester.

According to claim 12 of the present invention, there is provided the mobile terminal testing method according to claim 9, further comprising: receiving a response signal (160) to the multicarrier test signal from the mobile terminal and analyzing the received response signal (S30), wherein the analyzing the received response signal (S30) includes acquiring reference signal received power indicating received power in the mobile terminal of reference signal components contained in the multicarrier test signal (S35).

With the above configuration, a mobile terminal testing method according to claim 12 of the present invention needs only to include one baseband signal output step that generates a baseband signal to acquire reference signal received power regardless of the number of carriers contained in the multicarrier test signal and therefore, a mobile terminal supporting the multicarrier mode can be tested with a structure simpler than before.

According to claim 13 of the present invention, there is provided the mobile terminal testing method according to claim 12, further comprising: displaying the acquired reference signal received power for each carrier contained in the multicarrier test signal (S28).

With the above configuration, a mobile terminal testing method according to claim 13 of the present invention includes the displaying the acquired reference signal received power for each carrier and therefore, a more detailed analysis result can be presented to a tester.

According to claim 14 of the present invention, there is provided the mobile terminal testing method according to claim 9, further comprising: calculating the frequency shift value (S12), wherein the calculating the frequency shift value (S12) includes calculating the oscillation frequency from a maximum center frequency and a minimum center frequency of each center frequency of the first radio frequency signal and the second radio frequency signal and calculating each frequency shift value of the baseband signal and the reproduced baseband signal based on the calculated oscillation frequency.

With the above configuration, a mobile terminal testing method according to claim 14 of the present invention includes the calculating each frequency shift value and therefore, each frequency shift value of the baseband signal and reproduced baseband signal can be calculated.

According to claim 15 of the present invention, there is provided the mobile terminal testing method according to claim 9, further comprising: adjusting each signal level of the baseband signal and the reproduced baseband signal (S23), wherein the adding the baseband signal including adding the baseband signal (120) and the reproduced baseband signal (121) whose signal level is adjusted.

With the above configuration, a mobile terminal testing method according to claim 15 includes the adjusting each signal level and therefore, each signal level of the baseband signal and reproduced baseband signal can be adjusted to a desired value.

According to claim 16 of the present invention, there is the mobile terminal testing method according to claim 9, wherein the multicarrier test signal has a plurality of (N+1) radio frequency signals having mutually different center frequencies, the outputting a baseband signal (110) includes outputting a plurality of (N) reproduced baseband signals, the shifting a frequency of the reproduced baseband signal includes frequency-shifting the baseband signal and the plurality of (N) reproduced baseband signals by mutually different frequency shift values, and the adding the baseband signal includes adding all of the baseband signal and the plurality of (N) reproduced baseband signals that are frequency-shifted.

With the above configuration, in a mobile terminal testing method according to claim 16, the N reproduced baseband signals are prepared from one baseband signal and frequency-shifted by mutually different frequency shift values. Then, these signals are all added and output as an added baseband signal in the baseband signal addition step.

That is, a mobile terminal testing method according to claim 16 of the present invention needs only to prepare one baseband signal outputting that generates a baseband signal in a testing method of a mobile terminal regardless of the number of carriers (N+1) contained in a multicarrier test signal.

The present invention can provide a mobile terminal testing means and a mobile terminal testing method achieving an effect of being able to test a mobile terminal supporting the multicarrier mode with a structure simpler than before.

BRIEF DESCRIPTION OF THE SEVERAL VIEWS OF THE DRAWING

FIG. 1A is a block diagram schematically showing a wireless system to which a multicarrier mode according to an embodiment of the present invention is applied;

FIGS. 1B, 1C, and 1D schematically show each signals of multicarrier modes of the wireless system shown in FIG. 1;

FIG. 3 is a block diagram showing a configuration of the mobile terminal testing device according to an embodiment of the present invention;

FIG. 4 is a main flow chart showing an operation of the mobile terminal testing device according to an embodiment of the present invention;

FIG. 5 is a flow chart in a setting step of the mobile terminal testing device according to an embodiment of the present invention;

FIG. 6A shows a multicarrier test signal in an embodiment of a mobile terminal testing device according to the present invention;

FIG. 6B is an explanatory view of signal processing in an embodiment of the mobile terminal testing device according to the present invention;

FIG. 8 is a flow chart of analysis processing (throughput) in an embodiment of the mobile terminal testing device according to the present invention;

FIG. 9 is a flow chart of analysis processing (RSRP) in an embodiment of the mobile terminal testing device according to the present invention; and FIG. 10 is a diagram showing a display example of an analysis processing result in an embodiment of the mobile terminal testing device according to the present invention.

DETAILED DESCRIPTION OF THE INVENTION

Figure 2:
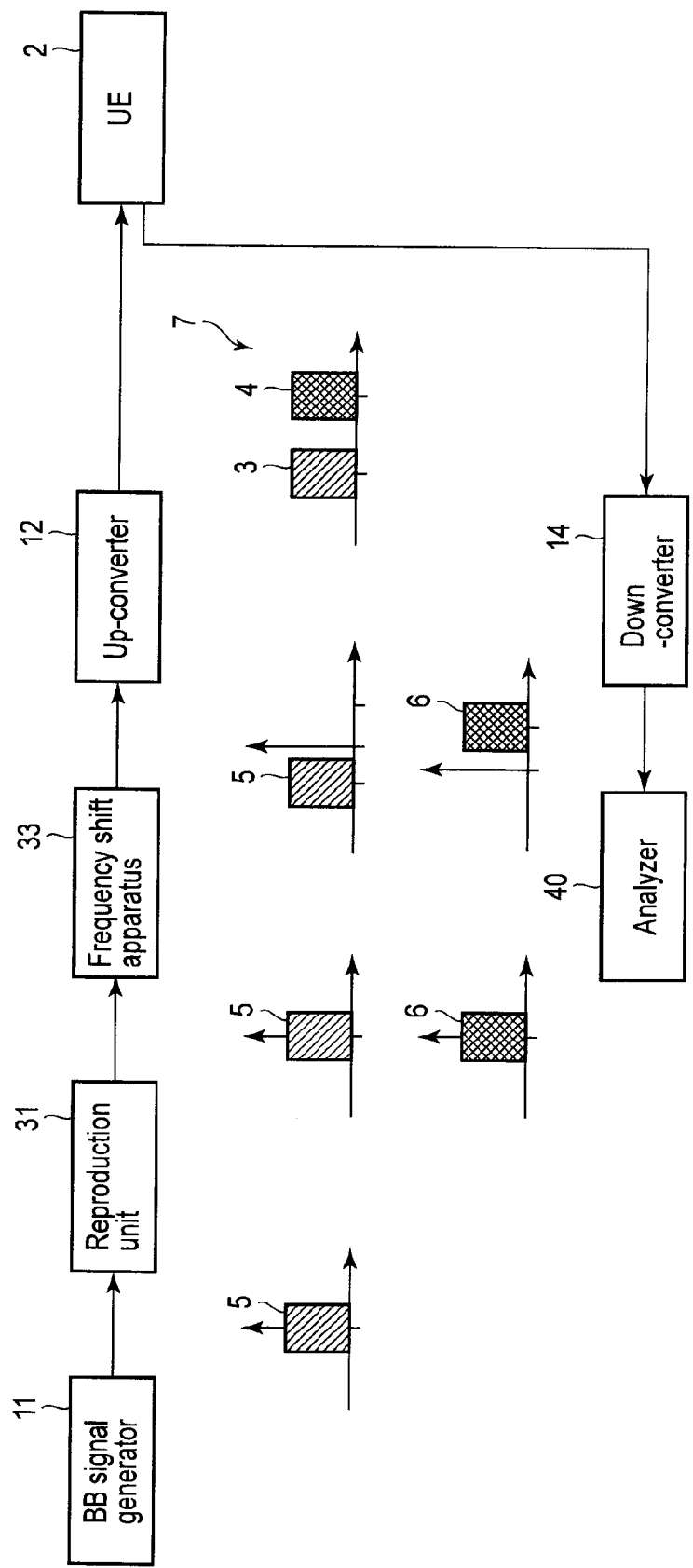
FIG. 2 is a block diagram showing an outline configuration of a mobile terminal testing device to provide an overview of the mobile terminal testing device according to an embodiment of the present invention.

Hereinafter, an embodiment of the present invention will be described with reference to the drawings.

(Overview of the Present Invention)

First, an overview of the present invention will be provided and then, an embodiment of the present invention will be described.

In a wireless system shown in FIG. 1A, it is assumed that a downlink signal from a base station 1 to UE 2 (User Equipment), for example, a mobile terminal 2 is a signal in a multicarrier mode based on the W-CDMA standard. In the wireless system, the downlink signal can take signal forms configured by carriers schematically shown in FIGS. 1B, 1C, and 1D.

That is, a downlink signal in the DC (Dual Carrier (Dual Cell))-HSDPA standard shown in FIG. 1B contains one primary carrier 3 and one secondary carrier 4. A downlink signal in the 4C (4carrier)-HSDPA standard shown in FIG. 1C contains the one primary carrier 3 and the three secondary carriers 4 (4a to 4c). A downlink signal in the 8C (8carrier)-HSDPA standard shown in FIG. 1D contains the one primary carrier 3 and the seven secondary carriers 4 (4a to 4g).

Therefore, in a conventional mobile terminal testing device, it is necessary to prepare as many baseband signal generators as the number equal to the number of carriers totaling primary carriers and secondary carriers when a test is performed to the UE 2 by a downlink signal in multicarrier mode.

Among test items to the UE 2, for example, test items like the calculation of throughput and acquisition of RSRP (Reference Signal Received Power) do not necessarily require that signals of those other than primary carriers be independently generated and only the presence of a signal according to a predetermined format is needed. The inventors of the present invention invented a mobile terminal testing device by focusing on this point and enable to perform a test with a structure simpler than before when the calculation of throughput or acquisition of RSRP by reproducing a signal of primary carriers in a baseband region and artificially setting the reproduced signal as a signal of secondary carriers.

FIG. 2 shows an outline configuration of the mobile terminal testing device. That is, the mobile terminal testing device according to an embodiment of the present invention includes, as the configuration of principal units, a baseband (BB) signal generator 11, a reproduction unit 31, a frequency shift apparatus 33, an up-converter 12, a down-converter 14, and an analyzer 40.

In the mobile terminal testing device, the BB signal generator 11 generates a baseband signal 5. The reproduction unit 31 reproduces the baseband signal 6 based on the baseband signal 5 and outputs the baseband signal 5 as the reproduction source and a reproduced baseband signal 6. The frequency shift apparatus 33 frequency-shifts each of the baseband signal 5 and the reproduced baseband signal 6. The up-converter 12 up-converts the added baseband signal 5 and reproduced baseband signal 6 from the baseband region to the radio frequency (RF) region to transmit a multicarrier test signal 7 containing the primary carriers 3 and the secondary carriers 4 to the UE 2.

The down-converter 14 down-converts a response signal received from the UE 2 into a signal in the baseband region and outputs the signal to the analyzer 40. The analyzer 40 analyzes a signal from the down-converter 14 to perform the calculation of throughput or the acquisition of RSRP.

A mobile terminal testing device having the above configuration needs to include only one unit of the BB signal generator 11 that generates a signal in the baseband region and does not need to prepare as many generators as the number of carriers and therefore, the calculation of throughput or the acquisition of RSRP can be tested with a structure simpler than before.

(Embodiment)

Next, an embodiment of a mobile terminal testing device according to the present invention will be described.

First, the configuration of the mobile terminal testing device will be described.

As shown in FIG. 3, a mobile terminal testing device 10 according to an embodiment includes a BB signal generator 11, an I-phase component (in-phase component) processing unit 20, a Q-phase component (quadrature component) processing unit 30, an up-converter 12, a combination unit 13, a down-converter 14, an operation unit 15, a control unit 16, a display controller 17, a display unit 18, and an analyzer 40. The mobile terminal testing device 10 is configured by, for example, a computer including a CPU, ROM, RAM, HDD, and interface.

The BB signal generator 11 generates baseband signals of an I-phase component and a Q-phase component based on a control signal from the control unit 16 and outputs the baseband signal of the I-phase component (hereinafter, referred to as an "I-phase BB signal") to the I-phase component processing unit 20 and the baseband signal of the Q-phase component (hereinafter, referred to as a "Q-phase BB signal") to the Q-phase component processing unit 30. The BB signal generator 11 constitutes a baseband signal output unit according to the present invention.

Because the I-phase component processing unit 20 and the Q-phase component processing unit 30 have similar configurations, the configuration of only the Q-phase component processing unit 30 is illustrated in FIG. 3 and the illustration of the I-phase component processing unit 20 is omitted.

The Q-phase component processing unit 30 includes a reproduction unit 31, a level control apparatus 32, a frequency shift apparatus 33, an adder 34, and a digital/analog converter (DAC) 35.

The reproduction unit 31 is configured to reproduce n Q-phase BB signals 110 after the Q-phase BB signal 110 being input from the BB signal generator 11. n is an integer equal to 1 or greater and information about this n is contained in a control signal from the control unit 16. The n Q-phase BB signals 110 reproduced by the reproduction unit 31 will be denoted by reproduced Q-phase BB signals 111, 112, . . . , 11n. The reproduction unit 31 constitutes a reproduced baseband signal output unit according to the present invention.

The level control apparatus 32 includes (n+1) level controllers 320, 321, . . . , 32n and is configured to vary the signal level of each signal input from the reproduction unit 31 based on a control signal from the control unit 16. The level control apparatus 32 constitutes a signal level adjustment unit according to the present invention.

For example, the level controller 320 is configured, after the Q-phase BB signal 110 as a reproduction source being input from the reproduction unit 31, to output the signal as a Q-phase BB signal 120 by setting the signal level thereof to a predetermined value. Also, for example, the level controller 321 is configured, after the reproduced Q-phase BB signal 111 being input from the reproduction unit 31, to output the signal as a Q-phase BB signal 121 by setting the signal level thereof to a predetermined value.

The frequency shift apparatus 33 includes (n+1) frequency shift units 330, 331, ..., 33n and is configured to vary the center frequency of each signal input from the level control apparatus 32 based on a control signal from the control unit 16. The frequency shift apparatus 33 constitutes a frequency shift unit according to the present invention.

For example, the frequency shift unit 330 is configured, after the Q-phase BB signal 120 being input from the level controller 320, to output the signal as a Q-phase BB signal 130 by setting the center frequency thereof to a predetermined value. Also, for example, the frequency shift unit 331 is configured, after the Q-phase BB signal 121 being input from the level controller 321, to output the signal as a Q-phase BB signal 131 by setting the center frequency thereof to a predetermined value.

The adder 34 is configured to add (n+1) Q-phase BB signals 130, 131, ..., 13n output by the frequency shift unit 330 and to output an added Q-phase BB signal 140 after the addition to the DAC 35. The adder 34 constitutes a baseband signal addition unit according to the present invention.

The DAC 35 is configured to convert the added Q-phase BB signal 140 as a digital signal into an analog signal and to output an analog-valued Q-phase BB signal to the up-converter 12.

The up-converter 12 is configured, after an I-phase BB signal and a Q-phase BB signal as analog values input from the I-phase component processing unit 20 and the Q-phase component processing unit 30 respectively being quadrature-modulated, to further generate a multicarrier test signal 150 in the RF region by frequency conversion and to output the signal to the UE 2. Information about the oscillation frequency to make the frequency conversion is contained in a control signal from the control unit 16. The up-converter 12 constitutes a radio frequency test signal output unit according to the present invention.

The combination unit 13 is configured to output the multicarrier test signal 150 output by the up-converter 12 to the UE 2. The combination unit 13 is also configured to output a response signal 160 as a signal in the RF region output by the UE 2 in response to the multicarrier test signal 150 to the down-converter 14.

The down-converter 14 is configured to acquire an analog-valued response signal in the baseband region by performing the frequency conversion and demodulation processing on the response signal 160 as a signal in the RF region based on a control signal from the control unit 16 and to output a digital-valued response signal 170 obtained by AD conversion of the response signal to the analyzer 40.

The operation unit 15 is operated by a tester to set testing conditions for the UE 2. For example, the type of BB signals the BB signal generator 11 is caused to generate, the center frequency and signal level of each carrier, test items and the like are set through the operation unit 15. The operation unit 15 is configured by an input device such as a keyboard, a dial, or a mouse, a display device to display testing conditions and the like, and a control circuit or software that controls the input device and display. Testing conditions are set by, for example, the selection from a list of each testing condition or input of numeric values of the frequency, signal level and the like to be set.

The control unit 16 is configured to decide the frequency shift value and the oscillation frequency for RF conversion for each carrier based on the center frequency of each carrier set by the operation unit 15.

The control unit 16 is also configured to output information by the operation unit 15 to each unit. The control unit 16 constitutes a frequency shift value calculation unit according to the present invention.

The analyzer 40 includes a throughput calculation unit 41 that calculates throughput and an RSRP acquisition unit 42 that acquires the value of RSRP and is configured to analyze the response signal 170 input from the down-converter 14 and to perform calculation processing of throughput and acquisition processing of RSRP. The analyzer 40 is also configured to output throughput and data of RSRP to the display controller 17. The analyzer 40 constitutes a response signal analyzer according to the present invention.

The RSRP acquisition unit 42 constitutes a reference signal received power acquisition unit according to the present invention.

The display controller 17 is configured to exercise display control to cause the display unit 18 to display throughput and data of RSRP on the screen thereof.

The display unit 18 is configured by, for example, a liquid crystal display and is configured to display throughput and data of RSRP input from the display controller 17. The display unit 18 constitutes a display unit according to the present invention.

In the present embodiment the frequency shift apparatus 33 is arranged subsequently to the level control apparatus 32, but the frequency shift apparatus 33 may be arranged subsequently to the reproduction unit 31 and the level control apparatus 32 may be arranged subsequently thereto.

Next, the operation of the mobile terminal testing device shown in FIG. 3 will be described.

As shown in the main flow chart in FIG. 4, the operation of the mobile terminal testing device 10 in the present embodiment includes a setting step (step S10) and an execution step (step S20).

First, the setting step will be described using the flow chart in FIG. 5 while referring to FIG. 3 if necessary.

As shown in FIG. 5, the setting step includes a setting step (step S11) by the operation unit 15, a decision step (step S12) by the control unit 16, and a setting step (step S13) by the control unit 16.

In step S11, the tester operates the operation unit 15 to set the type of a multicarrier test signal output to the UE 2, the center frequency and signal level of each carrier, test items and the like. Information set through the operation unit 15 is output to the control unit 16.

In the operation description below, it is assumed that a multicarrier test signal output to the UE 2 is a signal conforming to the DC-HSDPA standard and is the multicarrier test signal 150 shown in FIG. 6A.

As shown in FIG. 6A, the multicarrier test signal 150 includes a primary carrier 151 (first radio frequency signal) whose center frequency is 800 MHz and a secondary carrier 152 (second radio frequency signal) whose center frequency is 850 MHz. The primary carrier 151 and the secondary carrier 152 have the same bandwidth and are mutually different in signal level. In the present embodiment, the tester selects the DC-HSDPA standard and sets the center frequency and signal level by operating the operation unit 15.

In step S12, the control unit 16 decides the oscillation frequency for frequency conversion and the frequency shift value for each carrier based on information set through the operation unit 15.

More specifically, the control unit 16 calculates the oscillation frequency for frequency conversion from the maximum center frequency and the minimum center frequency of a multicarrier test signal to be output to the UE 2 by the following formula [1]:

Oscillation frequency for frequency conversion=
(maximum center frequency+minimum center frequency)/2     Formula [1]

In the multicarrier test signal 150 shown in FIG. 6A, the maximum center frequency=850 MHz and the minimum center frequency=800 MHz and thus, the oscillation frequency for frequency conversion=825 MHz is obtained.

The control unit 16 calculates the frequency shift value by the formula [2] from the center frequency of a carrier to be frequency-shifted of carriers contained in a multicarrier test signal to be output to the UE 2 and the oscillation frequency for frequency conversion.

Frequency shift value=center frequency−oscillation frequency for frequency conversion     Formula [2]

When the primary carrier 151 of the multicarrier test signal 150 shown in FIG. 6A is to be frequency-shifted, the center frequency=800 MHz and the oscillation frequency for frequency conversion=825 MHz and thus, the frequency shift value=−25 MHz is obtained.

On the other hand, when the secondary carrier 152 is to be frequency-shifted, the center frequency=850 MHz and the oscillation frequency for frequency conversion=825 MHz and thus, the frequency shift value=+25 MHz is obtained.

Incidentally, the control unit 16 may exercise control so that one carrier of the primary carrier 151 and the secondary carrier 152 is not frequency-shifted. If this is applied to the above example and the primary carrier 151 is not frequency-shifted and the secondary carrier 152 is frequency-shifted, the oscillation frequency for frequency conversion=center frequency of the carrier that is not frequency-shifted (=800 MHz) is obtained and the frequency shift value=center frequency of the frequency-shifted carrier−center frequency of the carrier that is not frequency-shifted (=850 MHz−800 MHz=+50 MHz) is obtained.

In step S13, the control unit 16 sets testing conditions to each unit. More specifically, the control unit 16 sets as follows.

The control unit 16 outputs and sets data of the calculated oscillation frequency for frequency conversion to the up-converter 12 and the down-converter 14. The control unit 16 output and sets data of the calculated frequency shift value to a frequency shift apparatus (illustration thereof omitted) of the I-phase component processing unit 20 and the frequency shift apparatus 33 of the Q-phase component processing unit 30. The control unit 16 outputs information indicating the DC-HSDPA standard as the type of a BB signal to the BB signal generator 11. The control unit 16 instructs the analyzer 40 to calculate throughput and acquire RSRP as targets of analysis. The control unit 16 outputs and sets data of the signal level to a signal level control apparatus (illustration thereof omitted) of the I-phase component processing unit 20 and the level control apparatus 32 of the Q-phase component processing unit 30.

Figure 7:
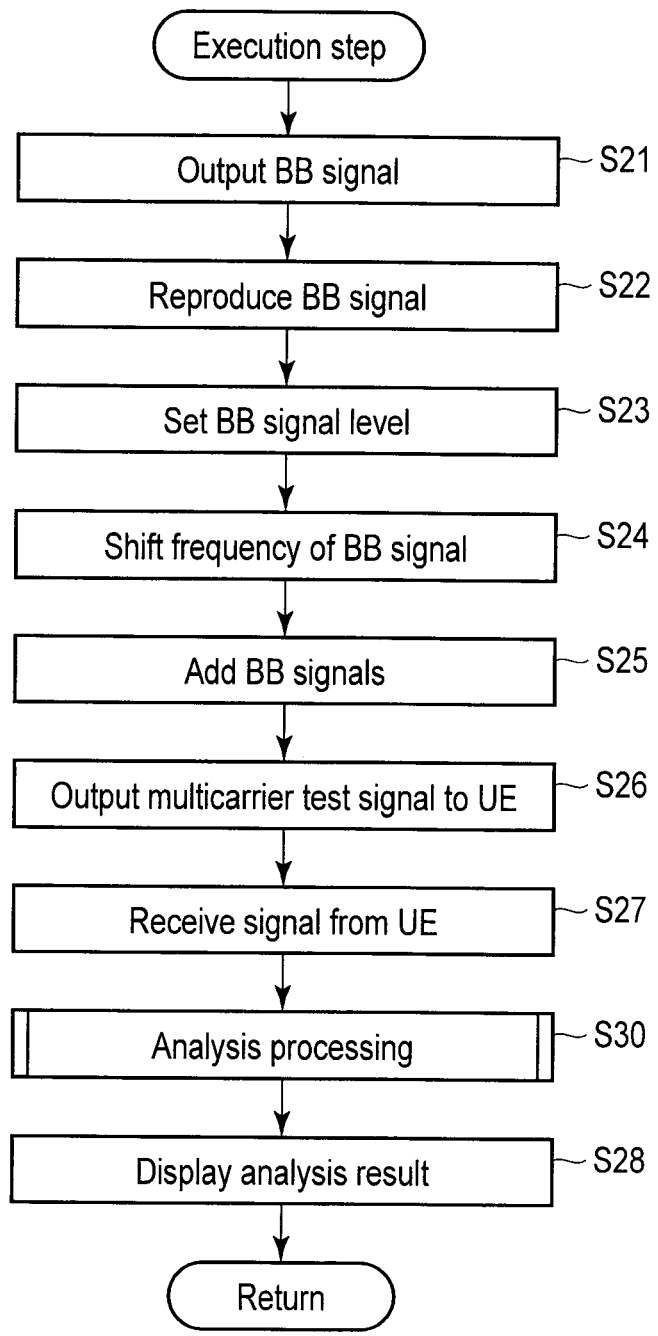
FIG. 7 is a flow chart in an execution step in an embodiment of the mobile terminal testing device according to the present invention.

First, the execution step will be described using the flow chart in FIG. 7 while referring to FIGS. 3 and 6B if necessary. While a Q-phase BB signal processed by the Q-phase component processing unit 30 will be described below, an I-phase BB signal is similarly processed by the I-phase component processing unit 20.

The BB signal generator 11 generates one signal of the Q-phase BB signal 110 conforming to the DC-HSDPA standard and outputs the signal to the reproduction unit 31 (step S21). As shown in FIG. 6, the Q-phase BB signal 110 has 0 Hz as the center frequency, a preset value as the signal level, and a bandwidth conforming to the DC-HSDPA standard.

The reproduction unit 31 reproduces the Q-phase BB signal 110 (step S22). Then, the reproduction unit 31 outputs the Q-phase BB signal 110 as a reproduction source to the level controller 320 of the level control apparatus 32 and outputs the reproduced Q-phase BB signal 111 to the level controller 321 of the level control apparatus 32.

The level control apparatus 32 sets the signal level of the Q-phase BB signal 110 as a reproduction source and the reproduced Q-phase BB signal 111 that have been input based on the signal level set by the operation unit 15 (step S23). As shown, for example, in FIG. 6, the level controller 320 outputs the Q-phase BB signal 120 obtained by amplifying the signal level of the Q-phase BB signal 110 as a reproduction source to a setting value. In addition, the level controller 321 outputs the Q-phase BB signal 121 obtained by attenuating the signal level of the reproduced Q-phase BB signal 111 to the setting value.

The frequency shift apparatus 33 frequency-shifts each Q-phase BB signal whose signal level is set by the level control apparatus 32 based on the frequency shift value decided by the control unit 16 (step S24). In the multicarrier test signal 150 shown in FIG. 6A, as described above, the frequency shift value of the primary carrier 151 is −25 MHz and the frequency shift value of the secondary carrier 152 is +25 MHz. Therefore, the frequency shift units 330, 331 of the frequency shift apparatus 33 performs processing as follows.

The frequency shift unit 330 obtains the Q-phase BB signal 130 obtained by shifting the center frequency of the Q-phase BB signal 120 from the frequency shift reference frequency (0 MHz in the present embodiment) in the negative direction by 25 MHz. The frequency shift unit 331 obtains the Q-phase BB signal 131 obtained by shifting the center frequency of the Q-phase BB signal 121 from the frequency shift reference frequency in the positive direction by 25 MHz.

Thus, performance of the signal bandwidth demanded for the subsequent DAC 35 does not have to be high by making the frequency bandwidth equal in the positive direction and the negative direction with respect to the frequency shift reference frequency for a BB signal after addition.

The adder 34 adds signals output by the frequency shift apparatus 33 (step S25) and outputs an added signal to the DAC 35. The adder 34 obtains, as shown in FIG. 6B, the added Q-phase BB signal 140 by adding the Q-phase BB signal 130 output by the frequency shift unit 330 of the frequency shift apparatus 33 and the Q-phase BB signal 131 output by the frequency shift unit 331. The added Q-phase BB signal 140 is a digital-valued signal and so is converted into an analog signal by the DAC 35 before being input into the up-converter 12.

After an I-phase BB signal and a Q-phase BB signal as analog values input from the I-phase component processing unit 20 and the Q-phase component processing unit 30 respectively being quadrature-modulated, the up-converter 12 generates a multicarrier test signal by frequency conversion based on the oscillation frequency for frequency conversion (825 MHz) and outputs the multicarrier test signal to the UE 2 via the combination unit 13 (step S26). In the example shown in FIG. 6B, the up-converter 12 outputs the multicarrier test signal 150 containing the primary carrier 151 whose center frequency is 800 MHz and the secondary carrier 152 whose center frequency is 850 MHz to the UE 2.

The combination unit 13 receives a response signal to the multicarrier test signal 150 (step S27) and outputs the response signal as the response signal 160 to the down-converter 14. The response signal 160 is down-converted by the down-converter 14 based on the oscillation frequency for frequency conversion (825 MHz) and further AD-converted to become the response signal 170 in the baseband region before being output to the analyzer 40.

The analyzer 40 performs predetermined analysis processing on the response signal 170 (step S30). A signal indicating an analysis processing result is output to the display unit 18 via the display controller 17. The display unit 18 displays an analysis result on the screen thereof (step S28).

Incidentally, the order of step S23 and step S24 described above may be interchanged.

The analysis processing in step S30 will be described using FIGS. 8 and 9.

First, the calculation of throughput will be described based on FIG. 8.

The throughput calculation unit 41 acquires information about data rate per block from a received signal (response signal 170) from the UE 2 (step S31).

The throughput calculation unit 41 counts ACK signals and NACK signals contained in the received signal (response signal 170) from the UE 2 (step S32). The ACK signal is transmitted by the UE 2 in response to the multicarrier test signal 150 and indicates successful reception. On the other hand, the NACK signal is transmitted by the UE 2 in response to the multicarrier test signal 150 and indicates a reception failure.

In addition to counting ACK signals and NACK signals, the throughput calculation unit 41 may count DTX (Discontinuous Transmission) signals. The DTX signal is a determination result that the UE 2 did not transmit the response signal 170 in response to the multicarrier test signal 150 and indicates that UE 2 could not receive the multicarrier test signal 150.

The throughput calculation unit 41 calculates throughput based on the formula [3]. Incidentally, the throughput calculation unit 41 may also calculate throughput for each carrier component.

$$\text{Throughput(bps)} = \text{data rate} \times \text{number of counted ACK signals} / (\text{number of counted ACK signals} + \text{number of counted NACK signals}) \quad \text{Formula [3]}$$

When DTX signals are also counted, throughput is calculated as shown below:

$$\text{Throughput(bps)} = \text{data rate} \times \text{number of counted ACK signals} / (\text{number of counted ACK signals} + \text{number of counted NACK signals} + \text{number of counted DTX signals}) \quad \text{Formula [4]}$$

Next, the acquisition of the RSRP value will be described based on FIG. 9.

The RSRP acquisition unit 42 acquires the value of RSRP contained in a received signal (response signal 170) from the UE 2 (step S35). Incidentally, the RSRP acquisition unit 42 may acquire the value of RSRP for each carrier component.

Next, a display example of an analysis result displayed in the display unit 18 will be described using FIG. 10.

In FIG. 10, the setting value of the signal level set by the operation unit 15 before a test and the value of throughput at each signal level calculated by the throughput calculation unit 41 are associated and displayed. In addition, the value of RSRP acquired by the RSRP acquisition unit 42 is also displayed. The values of throughput and RSRP are displayed for each carrier component (CC1, CC2, ...).

A more detailed analysis result can be presented to the tester by, as shown in FIG. 10, an analysis result being displayed by the display unit 18 for each carrier component.

In the mobile terminal testing apparatus 10 in the present embodiment, as described above, the reproduction unit 31 reproduces the Q-phase BB signal 110 to output at least the one reproduced BB signal 111, the adder 34 adds the Q-phase BB signal 130 and the reproduced BB signal 131 that are frequency-shifted to output the added BB signal 140, and the up-converter 12 converts an added BB signal of the I phase and Q phase into the multicarrier test signal 150 in the RF region and outputs the signal to the UE 2 and therefore, the analyzer 40 can calculate throughput for the multicarrier test signal 150 and acquire RSRP.

That is, the mobile terminal testing device 10 in the present embodiment needs only to include the one BB signal generator 11 that generates a baseband signal to calculate throughput for the multicarrier test signal 150 and to acquire the value of RSRP regardless of the number of carriers contained in the multicarrier test signal 150.

Therefore, the mobile terminal testing device 10 according to the present invention can test a mobile terminal supporting the multicarrier mode with a structure simpler than before.

In the present embodiment, it is assumed that the analyzer 40 of the mobile terminal testing device 10 calculates throughput and acquires the value of RSRP, but the mobile terminal 2 to be tested may be configured to have such functions. In such a case, the mobile terminal 2 is connected to the mobile terminal testing device 10 or another personal computer by a control line like, for example, a USB (Universal Serial Bus) cable to notify the mobile terminal testing device 10 or the other personal computer of throughput the value of RSRP via the control line.

Therefore, as described above, a mobile terminal testing unit and a mobile terminal testing method according to the present invention achieve an effect of being able to test a mobile terminal supporting the multicarrier mode with a structure simpler than before and are useful as a mobile terminal testing unit and a mobile terminal testing method to test a mobile terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal testing device comprising:
   a baseband signal output means for outputting a baseband signal having a predetermined bandwidth and signal level;
   a radio frequency test signal output means for converting a frequency of the baseband signal based on a predetermined oscillation frequency to generate a test signal and outputting the test signal, wherein a multicarrier test signal is generated as the test signal, the multicarrier test signal including a first radio frequency signal having a first center frequency and a second radio frequency signal having a second center frequency that is different from the first center frequency, and the multicarrier test signal is output to a mobile terminal to be tested;
   a reproduced baseband signal output means for reproducing the baseband signal to output a reproduced baseband signal;
   a frequency shift means for shifting a frequency of the reproduced baseband signal by a desired frequency shift value; and
   a baseband signal addition means for adding the baseband signal and the frequency-shifted reproduced baseband signal to output an added baseband signal, wherein the added baseband signal is so frequency-converted as to generate the multicarrier test signal in the radio frequency test signal output means.

2. The mobile terminal testing device according to claim 1, further comprising: a response signal analysis means for receiving a response signal to the multicarrier test signal from the mobile terminal and to analyze the received response signal, wherein
the response signal analysis means includes a throughput calculation means that calculates throughput of the mobile terminal regarding the multicarrier test signal.

3. The mobile terminal testing device according to claim 2, further comprising: a display means for displaying the calculated throughput for each carrier contained in the multicarrier test signal.

4. The mobile terminal testing device according to claim 1, further comprising: a response signal analysis means for receiving a response signal to the multicarrier test signal from the mobile terminal and analyzing the received response signal, wherein
the response signal analysis means includes a reference signal received power acquisition unit that acquires reference signal received power indicating received power in the mobile terminal of reference signal components contained in the multicarrier test signal.

5. The mobile terminal testing device according to claim 4, further comprising: a display means for displaying the acquired reference signal received power for each carrier contained in the multicarrier test signal.

6. The mobile terminal testing device according to claim 1, further comprising: a frequency shift value calculation means for calculating the frequency shift value, wherein
the frequency shift value calculation means calculates the oscillation frequency from a maximum center frequency and a minimum center frequency of each center frequency of the first radio frequency signal and the second radio frequency signal and calculates each frequency shift value of the baseband signal and the reproduced baseband signal based on the calculated oscillation frequency.

7. The mobile terminal testing device according to claim 1, further comprising: a signal level adjustment means for adjusting each signal level of the baseband signal and the reproduced baseband signal, wherein
the baseband signal addition means adds the baseband signal and the reproduced baseband signal whose signal level is adjusted.

8. The mobile terminal testing device according to claim 1, wherein the multicarrier test signal has (N+1) radio frequency signals having mutually different center frequencies,
the reproduced baseband signal output means outputs the N reproduced baseband signals,
the frequency shift means frequency-shifts the baseband signal and the N reproduced baseband signals by mutually different frequency shift values, and
the baseband signal addition means adds all of the baseband signal and the N reproduced baseband signals that are frequency-shifted.

9. A mobile terminal testing method using a mobile terminal testing device, the mobile terminal testing device performing:
outputting a baseband signal having a predetermined bandwidth and signal level;
converting a frequency of the baseband signal based on a predetermined oscillation frequency to generate a test signal and outputting the test signal, wherein a multicarrier test signal is generated as the test signal, the multicarrier test signal including a first radio frequency signal having a first center frequency and a second radio frequency signal having a second center frequency that is different from the first center frequency, and the multicarrier test signal is output to a mobile terminal to be tested;
reproducing the baseband signal to output a reproduced baseband signal;
shifting a frequency of the reproduced baseband signal by a desired frequency shift value; and
adding the baseband signal and the frequency-shifted reproduced baseband signal to output an added baseband signal, wherein the added baseband signal is so frequency-converted as to generate the multicarrier test signal in the radio frequency test signal output step.

10. The mobile terminal testing method according to claim 9, the mobile terminal testing device further performing: receiving a response signal to the multicarrier test signal from the mobile terminal and analyzing the received response signal, wherein
the analyzing the received response signal includes calculating throughput of the mobile terminal regarding the multicarrier test signal.

11. The mobile terminal testing method according to claim 10, the mobile terminal testing device further performing: displaying the calculated throughput for each carrier contained in the multicarrier test signal.

12. The mobile terminal testing method according to claim 9, the mobile terminal testing device further performing: receiving a response signal to the multicarrier test signal from the mobile terminal and analyzing the received response signal, wherein
the analyzing the received response signal includes acquiring reference signal received power indicating received power in the mobile terminal of reference signal components contained in the multicarrier test signal.

13. The mobile terminal testing method according to claim 12, the mobile terminal testing device further performing: displaying the acquired reference signal received power for each carrier contained in the multicarrier test signal.

14. The mobile terminal testing method according to claim 9, the mobile terminal testing device further performing: calculating the frequency shift value, wherein
the calculating the frequency shift value includes calculating the oscillation frequency from a maximum center frequency and a minimum center frequency of each center frequency of the first radio frequency signal and the second radio frequency signal and calculating each frequency shift value of the baseband signal and the reproduced baseband signal based on the calculated oscillation frequency.

15. The mobile terminal testing method according to claim 9, the mobile terminal testing device further performing: adjusting each signal level of the baseband signal and the reproduced baseband signal, wherein
the adding the baseband signal including adding the baseband signal and the reproduced baseband signal whose signal level is adjusted.

16. The mobile terminal testing method according to claim 9, wherein the multicarrier test signal has a plurality of (N+1) radio frequency signals having mutually different center frequencies,
the outputting a baseband signal includes outputting a plurality of (N) reproduced baseband signals,
the shifting a frequency of the reproduced baseband signal includes frequency-shifting the baseband signal and the plurality of (N) reproduced baseband signals by mutually different frequency shift values, and the adding the baseband signal includes adding all of the baseband signal and the plurality of (N) reproduced baseband signals that are frequency-shifted.

\* \* \* \* \*